United States Patent
Natsui et al.

(10) Patent No.: US 9,893,356 B2
(45) Date of Patent: Feb. 13, 2018

(54) CATHODE ACTIVE MATERIAL FOR NONAQUEOUS ELECTROLYTE SECONDARY BATTERY, NONAQUEOUS ELECTROLYTE SECONDARY BATTERY, AND METHOD OF PRODUCING CATHODE ACTIVE MATERIAL FOR NONAQUEOUS ELECTROLYTE SECONDARY BATTERY

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 14/675,871

(22) Filed: Apr. 1, 2015

(65) Prior Publication Data
US 2015/0295238 A1    Oct. 15, 2015

(30) Foreign Application Priority Data
Apr. 15, 2014    (JP) .................. 2014-083575

(51) Int. Cl.
| | | |
|---|---|---|
| *H01M 4/505* | (2010.01) | |
| *H01M 10/052* | (2010.01) | |
| *H01M 4/485* | (2010.01) | |
| *C01G 45/12* | (2006.01) | |
| *H01M 4/04* | (2006.01) | |
| *H01M 4/131* | (2010.01) | |

(Continued)

(52) U.S. Cl.
CPC ........ *H01M 4/505* (2013.01); *C01G 45/1221* (2013.01); *C01G 45/1228* (2013.01); *H01M 4/0471* (2013.01); *H01M 4/131* (2013.01); *H01M 4/1391* (2013.01); *C01P 2002/72* (2013.01); *C01P 2002/76* (2013.01); *C01P 2006/40* (2013.01); *H01M 2/16* (2013.01); *H01M 4/621* (2013.01); *H01M 4/624* (2013.01); *H01M 10/052* (2013.01); *H01M 10/0568* (2013.01); *H01M 10/0569* (2013.01); *H01M 2300/004* (2013.01); *H01M 2300/0034* (2013.01)

(58) Field of Classification Search
CPC .......................... H01M 4/505; C01G 45/1228
See application file for complete search history.

(56) References Cited

U.S. PATENT DOCUMENTS

| | | | |
|---|---|---|---|
| 2008/0090149 A1* | 4/2008 | Sano ............... | H01M 4/134 429/220 |
| 2010/0081056 A1 | 4/2010 | Saito et al. | |
| 2010/0104944 A1* | 4/2010 | Saito ............... | H01M 4/131 429/223 |

FOREIGN PATENT DOCUMENTS

| | | |
|---|---|---|
| JP | 2000-156245 | 6/2000 |
| JP | 2010-092824 | 4/2010 |

(Continued)

*Primary Examiner* — Stephan Essex
(74) *Attorney, Agent, or Firm* — McDermott Will & Emery LLP (57) ABSTRACT

The cathode active material for a nonaqueous electrolyte secondary battery according to an aspect of the present disclosure mainly comprises a compound represented by a composition formula: $Li_xNa_y(Li_\alpha Na_\beta Mn_{1-\alpha-\beta})O_2$, where x, y, $\alpha$, and $\beta$ satisfy $0.75 \le x \le 1.0$, $0 < y \le 0.01$, $0.75 < x+y \le 1$, $0.16 \le \alpha \le 0.3$, $0 \le \beta \le 0.01$, and $0.2 \le \alpha+\beta \le 0.3$.

7 Claims, 2 Drawing Sheets

(51) Int. Cl.
*H01M 4/1391* (2010.01)
*H01M 2/16* (2006.01)
*H01M 4/62* (2006.01)
*H01M 10/0568* (2010.01)
*H01M 10/0569* (2010.01)

(56) References Cited

FOREIGN PATENT DOCUMENTS

| | | |
|---|---|---|
| JP | 2010-108912 | 5/2010 |
| JP | 2012-204281 | 10/2012 |
| JP | 2012-234772 | 11/2012 |

* cited by examiner

CATHODE ACTIVE MATERIAL FOR NONAQUEOUS ELECTROLYTE SECONDARY BATTERY, NONAQUEOUS ELECTROLYTE SECONDARY BATTERY, AND METHOD OF PRODUCING CATHODE ACTIVE MATERIAL FOR NONAQUEOUS ELECTROLYTE SECONDARY BATTERY

BACKGROUND

1. Technical Field

The present disclosure relates to a cathode active material for a nonaqueous electrolyte secondary battery, a nonaqueous electrolyte secondary battery, and a method of producing a cathode active material for a nonaqueous electrolyte secondary battery.

2. Description of the Related Art

Lithium ion batteries have high capacities and high energy densities, and can be easily miniaturized and reduced in weight. Accordingly, for example, a demand for lithium ion batteries has been increasing in power sources for portable small electronic equipment and electric vehicles.

In development of lithium ion batteries, an increase in capacity is an important technological issue, and a $Li_2MnO_3$—$LiMeO_2$ solid solution cathode material has attracted attention as a high-capacity material. In this chemical formula, Me represents a metal element. This solid solution cathode material utilizes not only the redox reaction of manganese (Mn) and the metal element, but also the redox reaction of oxygen. As a result, the solid solution cathode material has a higher discharge capacity than traditional laminar lithium-cobalt oxide. Japanese Unexamined Patent Application Publication No. 2012-234772 discloses a solid solution cathode material having an O3 structure prepared by direct lithiation. Japanese Unexamined Patent Application Publication No. 2012-204281 discloses a solid solution cathode material having an O2 structure prepared by ion exchange of $Na_xLi_yMeO_2$ having a P2 structure. The O2 structure, O3 structure, and P2 structure represent the structures of oxygen atoms located around lithium atoms and the numbers of cycles of the laminar structures, where O represents an octahedron structure; P represents a prism structure; and 2 and 3 represent the number of cycles of each layer.

SUMMARY

One non-limiting and exemplary embodiment provides a novel cathode active material.

A cathode active material for a nonaqueous electrolyte secondary battery according to one aspect of the present disclosure mainly comprising a compound represented by a composition formula: $Li_xNa_y(Li_\alpha Na_\beta Mn_{1-\alpha-\beta})O_2$, where x, y, α, and β satisfy $0.75 \leq x < 1.0$, $0 < y \leq 0.01$, $0.75 < x+y \leq 1$, $0.16 \leq \alpha \leq 0.3$, $0 \leq \beta \leq 0.01$, and $0.17 \leq \alpha+\beta \leq 0.3$.

The cathode active material for a nonaqueous electrolyte secondary battery according to the aspect of the present disclosure can provide a lithium ion battery including a novel cathode active material.

It should be noted that comprehensive or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Overview of Embodiments

An overview of the embodiments will be described.

The cathode active material for a nonaqueous electrolyte secondary battery according to an aspect of the present disclosure mainly comprises a compound represented by a composition formula: $Li_xNa_y(Li_\alpha Na_\beta Mn_{1-\alpha-\beta})O_2$, where x, y, α, and β satisfy $0.75 \leq x \leq 1.0$, $0 < y \leq 0.01$, $0.75 < x+y \leq 1$, $0.16 \leq \alpha \leq 0.3$, $0 \leq \beta \leq 0.01$, and $0.2 \leq \alpha+\beta \leq 0.3$.

The compound may have a crystal structure belonging to, for example, space group C2/m.

In the composition formula, α may satisfy, for example, $0.19 \leq \alpha \leq 0.3$, and/or β may satisfy, for example, $0 < \beta \leq 0.01$.

The cathode active material for a nonaqueous electrolyte secondary battery according to an aspect of the present disclosure mainly comprises a compound, for example, prepared from a precursor containing a compound represented by a composition formula: $Na_{10}Mn_4O_9$ by substituting sodium (Na) in the precursor with lithium (Li) in a molten salt containing Li.

The precursor may further contain, for example, at least one of $NaMnO_2$ and $Na_{14}Mn_2O_9$.

The nonaqueous electrolyte secondary battery according to an aspect of the present disclosure comprises, for example, a cathode containing the cathode active material according to any of the above, an anode containing an anode active material, a separator disposed between the cathode and the anode, and a nonaqueous electrolytic solution.

The method of producing a nonaqueous electrolyte secondary battery according to an aspect of the present disclosure comprises, for example, (a) preparing a precursor containing a compound represented by a composition formula: $Na_{10}Mn_4O_9$, and (b) immersing the precursor in a molten salt containing Li and substituting Na in the precursor with Li to prepare a cathode active material for a nonaqueous electrolyte secondary battery. In the present disclosure, "preparing a precursor" includes not only producing the precursor, but also getting the precursor, e.g., purchasing it.

The step (a) may include (a1) preparing a raw material mixture by mixing, for example, a raw material containing Na and a raw material containing Mn at a molar ratio of Na to Mn of 2.25 or more and 3.0 or less and (a2) preparing the precursor by sintering the raw material mixture.

In the step (a1), for example, the raw material containing Na and the raw material containing Mn may be mixed at a molar ratio of Na to Mn of 2.25 or more and less than 3.0. In the step (a2), for example, the precursor may further contain at least one of $NaMnO_2$ and $Na_{14}Mn_2O_9$.

In the step (a1), for example, the raw material containing Na and the raw material containing Mn may be mixed at a molar ratio of Na to Mn of 2.25 or more and 2.6 or less.

In the step (b), the molten salt containing Li may contain, for example, LiCl and LiNO$_3$.

The method may further comprise, for example, (c) rinsing the cathode active material for a nonaqueous electrolyte secondary battery, after the step (b).

The cathode active material for a nonaqueous electrolyte secondary battery may contain a compound represented by, for example, a composition formula: $Li_xNa_y(Li_\alpha Na_\beta Mn_{1-\alpha-\beta})O_2$, where x, y, $\alpha$, and $\beta$ satisfy $0.75 \le x \le 1.0$, $0 < y \le 0.01$, $0.75 < x+y \le 1$, $0.16 \le \alpha \le 0.3$, $0 \le \beta \le 0.01$, and $0.2 \le \alpha+\beta \le 0.3$.

In the composition formula, $\alpha$ may satisfy, for example, $0.19 \le \alpha \le 0.3$.

In the composition formula, $\beta$ may satisfy, for example, $0 < \beta \le 0.01$.

First Embodiment

[Cathode Active Material for Nonaqueous Electrolyte Secondary Battery]

An example of the cathode active material for a nonaqueous electrolyte secondary battery according to a first embodiment will be described.

The present inventors have diligently studied and, as a result, have arrived at synthesis of a novel compound having a large Li/Me ratio by using a compound having a large Na/Me ratio as a precursor and substituting Na with Li. The novel compound having a large Li/Mn ratio can be, for example, synthesized by substituting Na of $Na_{10}Mn_4O_9$ with Li. The inventors have found that the synthesized compound can absorb and desorb Li and thereby can be used as a cathode active material.

The cathode active material for a nonaqueous electrolyte secondary battery of this embodiment mainly comprises a compound represented by the following composition formula (1):

$$Li_xNa_y(Li_\alpha Na_\beta Mn_{1-\alpha-\beta})O_2 \qquad (1),$$

where
 $0.75 \le x \le 1.0$,
 $0 < y \le 0.01$,
 $0.75 < x+y \le 1$,
 $0.16 \le \alpha \le 0.3$,
 $0 \le \beta \le 0.01$, and
 $0.2 \le \alpha+\beta \le 0.3$.

In the compound represented by composition formula (1), if x is smaller than 0.75, the available amount of Li is small, resulting in an insufficient capacity. If x is larger than 1.0, the amount of Li on the Mn site is almost zero, resulting in unavailability of the redox reaction of oxygen and in an insufficient capacity.

In the composition formula (1), if y is 0, the structure tends to be unstable, resulting in insufficient cycle characteristics. If y is larger than 0.01, Li is prevented from diffusing, resulting in insufficient battery characteristics.

In the composition formula (1), if x+y is 0.75 or less, the available amount of Li is small, resulting in insufficient capacity. If x+y is larger than 1, resulting in unavailability of the redox reaction of oxygen and in an insufficient capacity.

In the composition formula (1), if $\alpha$ is smaller than 0.16, the structure is LiMeO$_2$-like rather than Li$_2$MeO$_3$-like. As a result, the redox reaction of oxygen cannot be effectively utilized. In addition, the amount of Li in the transition metal layer decreases, resulting in a reduction of the capacity. If $\alpha$ is larger than 0.3, the initial charge/discharge efficiency decreases, resulting in an insufficient capacity.

In the composition formula (1), if $\beta$ is larger than 0.01, Li is prevented from diffusing, resulting in insufficient battery characteristics. For example, $\beta$ may be 0. In a case of $\beta=0$, the diffusion of Li is not prevented, enabling a large capacity, whereas in a case of $\beta$ being larger than 0, the structure can be readily stabilized, enabling satisfactory cycle characteristics.

In the composition formula (1), if $\alpha+\beta$ is smaller than 0.2, the redox reaction of oxygen is unavailable, resulting in an insufficient capacity. If $\alpha+\beta$ is larger than 0.3, the initial charge/discharge efficiency decreases, resulting in an insufficient capacity.

The compound represented by composition formula (1) has a crystal structure belonging to space group C2/m. In composition formula (1), the ratio of Li to Mn is represented by $Li_{x+\alpha}/Mn_{1-\alpha-\beta}$, where x+$\alpha$ and $\alpha+\beta$ satisfy $0.94 \le x+\alpha \le 1.3$ and $0.7 \le \alpha+\beta \le 0.8$. Accordingly, the ratio of Li to Mn is theoretically $1.18 \le Li_{x+\alpha}/Mn_{1-\alpha-\beta} \le 1.86$, which is larger than 1. That is, the number of Li atoms per one Mn atom is larger than that in LiMnO$_2$. In composition formula (1), $Li_\alpha Na_\beta$ shown in the parentheses is believed to be located on the same site as that of Mn. Li located on the Mn site can be desorbed from or absorbed into the Mn site, with the redox reaction of oxygen. Accordingly, the compound represented by composition formula (1) allows absorption and desorption of a larger number of Li atoms per one Mn atom compared to that in LiMnO$_2$. Consequently, the cathode active material for a nonaqueous electrolyte secondary battery in this embodiment can be suitable for providing a nonaqueous electrolyte secondary battery having a high capacity.

The compound represented by composition formula (1) is, for example, synthesized by substituting Na in a precursor, $Na_{10}Mn_4O_9$, with Li. $Na_{10}Mn_4O_9$ is a compound having a crystal structure belonging to space group R3-mh (R 3-bar mh) and being unstable in air. Since $Na_{10}Mn_4O_9$ contains a large number of Na atoms in the crystal structure, as described above, a large number of Li atoms can replace the positions of Na atoms by the substitution reaction. Unsubstituted Na remains in the compound represented by composition formula (1). Since the ion radius of Li is smaller than that of Na, Na remaining in the crystal structure after the substitution of Na with Li partially distorts the crystal structure. As a result, the diffusibility of Li can be enhanced, and absorption and desorption of Li easily occur. The residual Na does not move even when the cathode active material is oxidized or reduced, and remains in the crystal structure. Consequently, the crystal structure can be prevented from excessive deformation due to the absorption or desorption of Li. Thus, the compound represented by composition formula (1) can achieve both a high capacity and high stability of the crystal structure.

The cathode active material for a nonaqueous electrolyte secondary battery of this embodiment comprises a compound represented by composition formula (1) as a main component. The cathode active material for a nonaqueous electrolyte secondary battery of this embodiment may contain, for example, the starting material, by-product, and degradation product, which are produced in the synthesis of the compound represented by composition formula (1), and inevitable impurities. Here, the term "main component" or "mainly comprising" means that the cathode active material for a nonaqueous electrolyte secondary battery of this embodiment contains the compound represented by composition formula (1) in a proportion of, for example, 90% by weight or more.

The compound represented by composition formula (1) can have a redox potential (Li/Li+ standard) of about 3.3 V. The compound represented by composition formula (1) can have a capacity of about 265 mAh/g or more.

[Method of Producing Cathode Active Material]

An example of the method of producing the cathode active material for a nonaqueous electrolyte secondary battery according to the first embodiment will be described.

A precursor, $Na_{10}Mn_4O_9$, of the cathode active material for a nonaqueous electrolyte secondary battery of this embodiment is first prepared. $Na_{10}Mn_4O_9$ can be produced by, for example, the following method. Raw materials containing Na and Mn are prepared. Examples of the raw material containing Na include $Na_2O$, $Na_2O_2$, $Na_2CO_3$, and NaOH. Examples of the raw material containing Mn include manganese oxides such as $MnO_2$; manganese salts such as $MnCO_3$ and $MnNO_3$; and manganese hydroxides such as $Mn(OH)_2$ and MnOOH. The raw material containing Na and the raw material containing Mn are weighed such that the molar ratio of Na to Mn is 2.25 or more and 3.0 or less. The molar ratio of Na to Mn may be 2.25 or more and less than 3.0. Detailed investigation by the present inventors demonstrates that when the molar ratio of Na to Mn is 2.5, $Na_{10}Mn_4O_9$ is prepared. When the molar ratio is shifted from 2.5 within the above-mentioned range, at least one of $NaMnO_2$ and $Na_{14}Mn_2O_9$ is generated as a by-product, in addition to $Na_{10}Mn_4O_9$. Here, if the amount of the by-product contained in the resulting precursor varies, the composition of the compounds to be generated in the subsequent step varies. Specifically, x, y, α, and β defining the compound represented by composition formula (1) vary within the ranges shown in the composition formula (1), depending on the amount of the by-product.

The raw material containing Na and the raw material containing Mn are mixed with each other by, for example, a wet method or a dry method. On this occasion, a mixing apparatus such as a ball mill may be used, for example. The resulting mixture of the raw materials is fired to obtain a precursor containing $Na_{10}Mn_4O_9$. The firing process is performed in, for example, an inert atmosphere, such as a nitrogen atmosphere or an argon atmosphere; or a reducing atmosphere, such as an atmosphere of a mixture of nitrogen and hydrogen. The firing is performed, for example, at 500° C. or more and 800° C. or less for 6 hours or more and 24 hours or less. A precursor substantially containing only $Na_{10}Mn_4O_9$ may be prepared by controlling the raw materials, the conditions of mixing the raw materials, and the conditions of the firing. Alternatively, a precursor containing $Na_{10}Mn_4O_9$ and at least one of $NaMnO_2$ and $Na_{14}Mn_2O_9$ may be prepared by controlling the molar ratio of Na to Mn within a range of 2.25 or more and less than 2.5. If the particles of the precursor are large, the precursor is optionally pulverized with, for example, a ball mill.

Subsequently, Na in $Na_{10}Mn_4O_9$ contained in the precursor is replaced by Li. Specifically, the precursor is immersed and left in a molten salt containing Li. The molten salt contains, for example, at least one selected from the group consisting of $LiNO_3$, LiCl, and LiOH. The molten salt may contain, for example, $LiNO_3$ and LiCl. The molten salt may be prepared by heating and melting at least one selected from the above-mentioned lithium salts. The precursor containing $Na_4Mn_2O_5$ is immersed and left in the molten salt for, for example, 1 hour or more and 3 hours or less. As a result, a substitution reaction of substituting Na with Li is caused. In order to perform the substitution reaction, the lithium salt is maintained, for example, at a temperature of not lower than the temperature at which the lithium salt melts. Furthermore, in order to promote the substitution reaction, the molten salt is maintained, for example, at a high temperature. However, a temperature of excessively higher than 350° C. causes a variation in the crystal structure of $Na_{10}Mn_4O_9$ does not provide a compound represented by composition formula (1). The process described above may provide a compound represented by composition formula (1).

The precursor may contain, for example, 98 parts by weight of $Na_4Mn_2O_5$ and 2 parts by weight of at least one of $NaMnO_2$ and $Na_{14}Mn_2O_9$.

The compound prepared by immersing the precursor in the molten salt is, for example, rinsed. As a result, the molten salt, Na, and other impurities may be removed to give the compound represented by composition formula (1) with a higher purity.

The composition of the resulting compound represented by composition formula (1) may be determined by, for example, inductively coupled plasma (ICP) emission spectrophotometry. The space group of the compound represented by composition formula (1) may be determined by, for example, powder X-ray analysis. The compound represented by composition formula (1) may be identified by these analyses.

The cathode active material for a nonaqueous electrolyte secondary battery of this embodiment contains a larger number of Li atoms per one Mn atom, compared to traditionally known $LiMnO_2$, and has a structure in which absorption and desorption of Li readily occur. Therefore, a nonaqueous electrolyte secondary battery comprising the cathode active material can have a high capacity.

Second Embodiment

An example of the nonaqueous electrolyte secondary battery according to a second embodiment will now be described with reference to the drawings.

Figure 1:
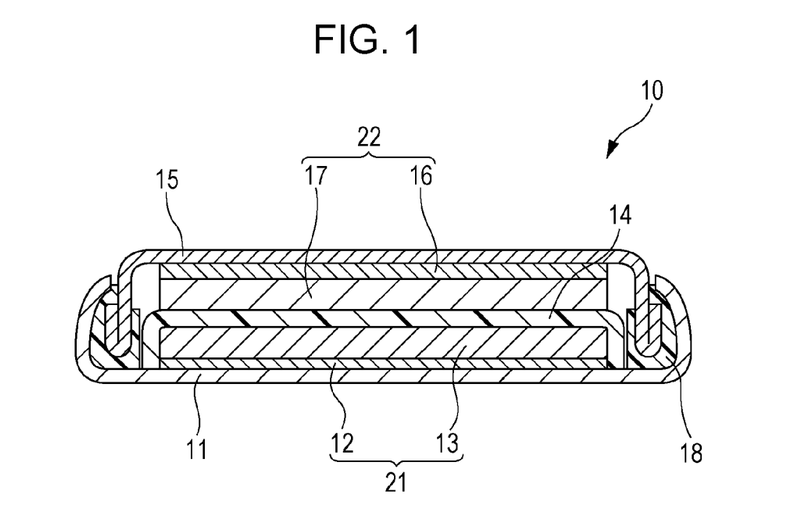
FIG. 1 is a schematic cross-sectional view illustrating an example of the structure of a nonaqueous electrolyte secondary battery.

As shown in FIG. 1, a nonaqueous electrolyte secondary battery 10 includes a cathode 21, an anode 22, and a separator 14. The separator 14 is disposed between the cathode 21 and the anode 22. The cathode 21, the anode 22, and the separator 14 are impregnated with a nonaqueous electrolyte. The nonaqueous electrolyte is, for example, a nonaqueous electrolytic solution. The nonaqueous electrolyte secondary battery 10 further includes a case 11, a sealing plate 15, and a gasket 18. The cathode 21, the anode 22, and the separator 14 form an electrode group. The electrode group is accommodated in the case 11. The case 11 is sealed with the gasket 18 and the sealing plate 15.

The cathode 21 includes a cathode current collector 12 and a cathode active material layer 13 on the cathode current collector 12. The cathode current collector 12 is, for example, made of a metal material such as aluminum, stainless steel, or an aluminum alloy. The case 11 may be used as the cathode current collector instead of the cathode current collector 12. The cathode active material layer 13 contains the cathode active material for a nonaqueous electrolyte secondary battery described in the first embodiment. The cathode active material layer 13 may optionally contain additives such as a conducting agent, an ion conduction auxiliary agent, and a binding agent.

The anode 22 includes an anode current collector 16 and an anode active material layer 17 on the anode current collector 16. The anode current collector 16 is made of a metal material such as aluminum, stainless steel, or an aluminum alloy. The sealing plate 15 may be used as the anode current collector instead of the anode current collector 16. The anode active material layer 17 contains an anode active material. The anode active material layer 17 may optionally contain additives such as a conducting agent, an ion conduction auxiliary agent, and a binding agent.

Examples of the anode active material include metal materials, carbon materials, oxides, nitrides, tin compounds, and silicon compounds. The metal material may be a metal simple substance or an alloy. Examples of the metal material include lithium metal and lithium alloys. Examples of the carbon material include natural graphite, coke, graphitizing carbon, carbon fibers, spherical carbon, artificial graphite, and amorphous carbon. From the viewpoint of capacity density, the anode active material may be silicon (Si), tin (Sn), a silicon compound, or a tin compound. Each of the silicon compound and the tin compound may be an alloy or a solid solution. An example of the silicon compound is $SiO_x$ ($0.05<x<1.95$). The anode active material may be a compound, i.e., an alloy or a solid solution, prepared by partially substituting Si in $SiO_x$ with another element. The another element is, for example, at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin. Examples of the tin compound include $Ni_2Sn_4$, $Mg_2Sn$, $SnO_x$ ($0<x<2$), $SnO_2$, and $SnSiO_3$. These tin compounds may be used alone or in combination of two or more thereof.

The anode active material may have any shape and may have, for example, a known shape such as a particulate or fibrous shape.

The anode active material layer 17 may be filled or occluded with lithium by any method. For example, lithium may be deposited on the anode active material layer 17 by a gas phase method such as vacuum evaporation. Alternatively, lithium metal foil may be brought into contact with the anode active material layer 17, and then the both may be heated. In these methods, lithium can diffuse into the anode active material layer 17 by heat. Alternatively, the anode active material layer 17 may be electrochemically occluded with lithium. For example, when a battery includes a lithium-free anode 22 and a lithium foil cathode, the battery is charged such that lithium is occluded in the anode 22.

Examples of the binding agent contained in the cathode 21 or the anode 22 include polyvinylidene fluoride, polytetrafluoroethylene, polyethylene, polypropylene, aramid resins, polyamides, polyimides, polyamideimides, polyacrylnitriles, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyethers, polyether sulfones, hexafluoropolypropylene, styrene-butadiene rubber, and carboxymethylcellulose. Alternatively, the binding agent contained in the cathode 21 or the anode 22 may be a copolymer of two or more materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. The binding agent may be a mixture of two or more materials selected from the above-mentioned materials.

Examples of the conducting agent contained in the cathode 21 or anode 22 include graphite, carbon black, conductive fibers, graphite fluoride, metal powders, conductive whisker, conductive metal oxides, and organic conductive materials. Examples of the graphite include natural graphite and artificial graphite. Examples of the carbon black include acetylene black, Ketjen black, channel black, furnace black, lamp black, and thermal black. An example of the metal powder is aluminum powder. Examples of the conductive whisker include zinc oxide whisker and potassium titanate whisker. An example of the conductive metal oxide is titanium oxide. Examples of the organic conductive material include phenylene derivatives.

The separator 14 may be made of a material having a high ion permeability and a sufficiently high mechanical strength. Examples of such a material include fine porous thin films, woven fabric, and nonwoven fabric. The separator 14 is made of, for example, a polyolefin such as polypropylene or polyethylene. The separator 14 made of a polyolefin not only has excellent durability but also can exhibit a shutdown function when it is excessively heated. The separator 14 has a thickness of, for example, within a range of 10 to 300 μm or 10 to 40 μm. The separator 14 may be a single layer film made of a single material or a composition or multilayer film made of two or more materials. The separator 14 has a porosity of, for example, within a range of 30% to 70% or 35% to 60%. The term "porosity" refers to the proportion of the volume of vacancy to the total volume of the separator 14 and may be measured by, for example, a mercury press-in method.

The nonaqueous electrolytic solution include a nonaqueous solvent and a lithium salt dissolved in the nonaqueous solvent. Examples of the nonaqueous solvent include cyclic carbonate solvents, chain carbonate solvents, cyclic ether solvents, chain ether solvents, cyclic ester solvents, chain ester solvents, and fluorine-based solvents. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. An example of the cyclic ester solvent is γ-butyrolactone. An example of the chain ester solvent is methyl acetate. Examples of the fluorine-based solvent include fluoroethylene carbonate, methyl fluoropropionate, fluorobenzene, fluoroethyl methyl carbonate, and fluorodimethylene carbonate. These nonaqueous solvents may be used alone or in combination of two or more thereof.

The nonaqueous electrolytic solution contains, for example, at least one fluorine-based solvent selected from the group consisting of fluoroethylene carbonate, methyl fluoropropionate, fluorobenzene, fluoroethyl methyl carbonate, and fluorodimethylene carbonate. The nonaqueous electrolytic solution containing such a fluorine-based solvent can have an enhanced resistance to oxidation. As a result, the nonaqueous electrolyte secondary battery 10 can be stably operated even when it is charged with a high voltage.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. These lithium salts may be used alone or in combination of two or more thereof. The concentration of the lithium salt is, for example, within a range of 0.5 to 2 mol/L.

In the nonaqueous electrolyte secondary battery of this embodiment, as described in the first embodiment, the cathode active material contains a large number of Li atoms per one Mn atom. Accordingly, a nonaqueous electrolyte secondary battery having a high capacity can be achieved.

The example of the lithium ion secondary battery described above has a coin-like shape. The shape of the lithium ion secondary battery is not limited to this. For example, the lithium ion secondary battery may have a cylindrical, rectangular, sheet-like, button-like, flat, or laminar shape.

EXAMPLES

Example 1

Figure 2:
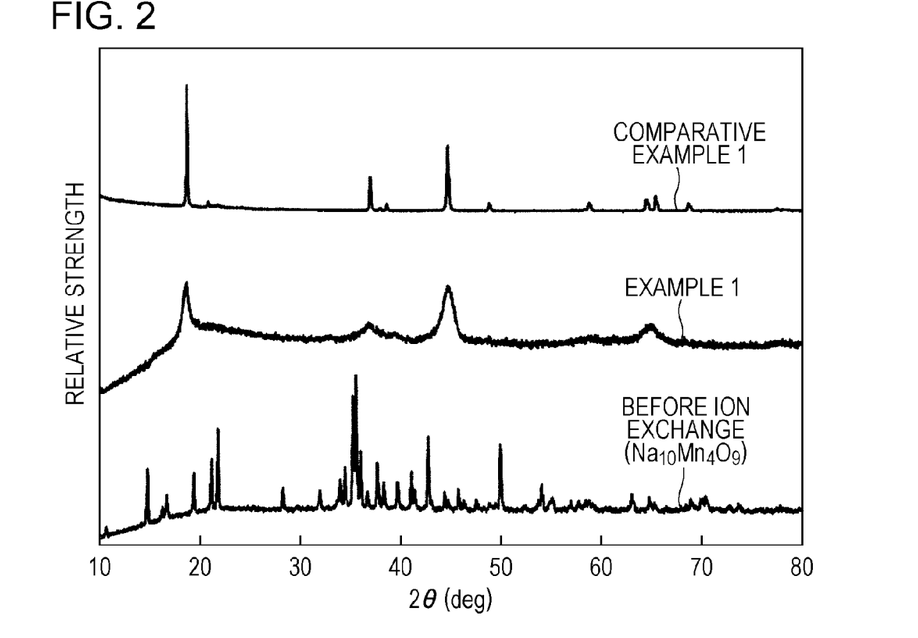
FIG. 2 is a graph showing powder X-ray diffraction charts of a precursor, the cathode active material of Example 1, and the cathode active material of Comparative Example 1.

MnO pulverized with a ball mill in advance and $Na_2O$ were mixed to give a mixture powder of the raw materials. On this occasion, the molar ratio of Na to Mn was 2.25. The raw material mixture was sealed in a gas mixture containing nitrogen and hydrogen, and was then fired at 540° C. to give a precursor. The precursor was subjected to powder X-ray diffraction measurement. The results are shown in FIG. 2. The precursor contained $Na_{10}Mn_4O_9$ and $NaMnO_2$. The molar ratio of $Na_{10}Mn_4O_9$ to the total amount of the precursor was 0.95.

Subsequently, $LiNO_3$ and LiCl were weighed at a molar ratio of 0.87:0.13 and in the total amount of 10 g. The weighed $LiNO_3$ and LiCl and 1 g of the precursor were placed in an alumina crucible and were then heated in the atmosphere at 280° C. for 2 hours. As a result, Na in the precursor was replaced by Li due to ion exchange reaction in a molten salt of $LiNO_3$ and LiCl. The resulting compound was then rinsed to give a cathode active material.

The cathode active material was subjected to powder X-ray diffraction measurement. The results are shown in FIG. 2. The space group of the cathode active material was C2/m. The composition of the cathode active material was determined by ICP emission spectrophotometry and inert gas fusion-infrared absorptiometry. The composition of the cathode active material was $Li_{0.75}Na_{0.01}(Li_{0.24}Na_{0.01}Mn_{0.75})O_2$.

Subsequently, 70 parts by mass of the cathode active material, 20 parts by mass of a conducting agent, 10 parts by mass of polyvinylidene fluoride (PVDF), and an appropriate amount of 2-methylpyrrolidone (NMP) were mixed to give a cathode mixture slurry. The cathode mixture slurry was applied to one surface of a cathode current collector formed by aluminum foil having a thickness of 20 μm and was then dried to give a cathode active material layer. The cathode current collector with the cathode active material layer was rolled to give a cathode plate. The cathode plate had a thickness of 60 μm. The cathode plate was punched into a disk having a diameter of 12.5 mm to give a cathode.

Lithium metal foil having a thickness of 300 μm was punched into a disk having a diameter of 14.0 mm to give an anode.

Fluoroethylene carbonate (FEC), ethylene carbonate (EC), and ethyl methyl carbonate (EMC) were mixed at a volume ratio of 1:1:6 to give a nonaqueous solvent. $LiPF_6$ was dissolved in this nonaqueous solvent to give a concentration of 1.0 mol/L. As a result, a nonaqueous electrolytic solution was prepared.

A separator (manufactured by Celgard, Product No. 2320, thickness: 25 μm) was impregnated with the nonaqueous electrolytic solution. A CR2032 standard coin-type battery was produced in a dry box controlled to a dew point of −50° C. Celgard 2320 is a separator composed of three layers: a polypropylene layer, a polyethylene layer, and a polypropylene layer.

Examples 2 to 10

Cathode active materials of Examples 2 to 10 were synthesized as in Example 1 except that the molar ratio of Na to Mn in the raw material mixture, the firing temperature, and the temperature of the molten salt during the ion exchange were changed, and then coin-type batteries were produced. Table 1 shows the conditions for producing cathode active materials in Examples 2 to 10 and the composition ratios of the synthesized cathode active materials. Table 2 shows products other than $Na_{10}Mn_4O_9$ in the precursors in Examples 2 to 10 and the respective molar ratios of $Na_{10}Mn_4O_9$ to the total amounts of the precursors.

Comparative Example 1

$LiOH \cdot H_2O$ and nickel-cobalt-manganese complex hydroxide were mixed to prepare a mixture powder of the raw materials. The raw material mixture was fired in the atmosphere at 800° C. to give particles of a lithium-manganese complex oxide. The cathode active material was subjected to powder X-ray diffraction measurement. The results are shown in FIG. 2. A coin-type battery was produced as in Example 1 using the particles of the lithium-manganese complex oxide.

[Results of Powder X-Ray Diffraction Measurement of Cathode Active Material]

FIG. 2 shows the powder X-ray diffraction charts of the cathode active material of Example 1, the cathode active material of Comparative Example 1, and the precursor of the cathode active material of Example 1. As obvious from FIG. 2, the powder X-ray diffraction chart of the cathode active material of Example 1 is completely different from that of the precursor. This demonstrates that Na of $Na_{10}Mn_4O_9$ was replaced by Li to produce a compound having a crystal structure different from that of $Na_{10}Mn_4O_9$. The powder X-ray diffraction chart of the cathode active material of Example 1 is also different from that of the cathode active material of Comparative Example 1.

[Evaluation of Battery]

The battery of Example 1 was charged at a current density at the cathode of 0.005 mA/cm² until a voltage of 4.9 V. Subsequently, the battery of Example 1 was discharged at a current density of 0.05 mA/cm² to a discharge cut-off voltage of 2.0 V. The initial discharge capacity was 310 mAh/g. The battery of Comparative Example 1 was charged at a current density at the cathode of 0.05 mA/cm² until a voltage of 4.7 V. Subsequently, the battery of Comparative Example 1 was discharged at a current density of 0.005 mA/cm² to a discharge cut-off voltage of 2.0 V. The initial discharge capacity of the battery of Comparative Example 1 was 275 mAh/g. Similarly, the capacities of coin-type batteries of Examples 2 to 10 were measured. The results are shown in Table 1.

TABLE 1

| | Conditions | | | | |
|---|---|---|---|---|---|
| Sample | Na/Mn molar ratio | Temperature (° C.) of firing | Ion exchange | Composition | Capacity (mAh/g) |
| Example 1 | 2.25 | 540 | $LiNO_3$—LiCL 280° C. | $Li_{0.75}Na_{0.01}(Li_{0.24}Na_{0.01}Mn_{0.75})O_2$ | 310 |

TABLE 1-continued

| Sample | Na/Mn molar ratio | Temperature (° C.) of firing | Ion exchange | Composition | Capacity (mAh/g) |
|---|---|---|---|---|---|
| Example 2 | 2.25 | 500 | LiNO$_3$—LiCL 280° C. | Li$_{0.75}$Na$_{0.01}$(Li$_{0.22}$Na$_{0.01}$Mn$_{0.77}$)O$_2$ | 300 |
| Example 3 | 2.25 | 450 | LiNO$_3$—LiCL 280° C. | Li$_{0.75}$Na$_{0.01}$(Li$_{0.21}$Na$_{0.01}$Mn$_{0.78}$)O$_2$ | 298 |
| Example 4 | 2.50 | 540 | LiNO$_3$—LiCL 280° C. | Li$_{0.75}$Na$_{0.01}$(Li$_{0.21}$Na$_{0.01}$Mn$_{0.77}$)O$_2$ | 295 |
| Example 5 | 2.25 | 540 | LiNO$_3$—LiCL 350° C. | Li$_{0.75}$Na$_{0.01}$(Li$_{0.23}$Na$_{0.01}$Mn$_{0.76}$)O$_2$ | 288 |
| Example 6 | 2.55 | 540 | LiNO$_3$—LiCl 280° C. | Li$_{0.75}$Na$_{0.01}$(Li$_{0.19}$Na$_{0.01}$Mn$_{0.72}$)O$_2$ | 286 |
| Example 7 | 2.75 | 540 | LiNO$_3$—LiCL 280° C. | Li$_{0.8}$Na$_{0.01}$(Li$_{0.16}$Na$_{0.01}$Mn$_{0.83}$)O$_2$ | 265 |
| Example 8 | 2.75 | 450 | LiNO$_3$—LiCL 280° C. | Li$_{0.78}$Na$_{0.01}$(Li$_{0.17}$Na$_{0.01}$Mn$_{0.82}$)O$_2$ | 271 |
| Example 9 | 2.25 | 540 | LiNO$_3$—LiCL 450° C. | Li$_{0.80}$Na$_{0.01}$(Li$_{0.16}$Na$_{0.01}$Mn$_{0.83}$)O$_2$ | 264 |
| Example 10 | 2.60 | 540 | LiNO$_3$—LiCl 280° C. | Li$_{0.75}$Na$_{0.01}$(Li$_{0.18}$Na$_{0.01}$Mn$_{0.73}$)O$_2$ | 274 |

TABLE 2

| Sample | Products other than Na$_{10}$Mn$_4$O$_9$ | Molar ratio of Na$_{10}$Mn$_4$O$_9$ to the total amount of precursor |
|---|---|---|
| Example 1 | NaMnO$_2$ | 0.95 |
| Example 2 | NaMnO$_2$ | 0.98 |
| Example 3 | NaMnO$_2$ | 0.96 |
| Example 4 | NaMnO$_2$, Na$_{14}$Mn$_2$O$_9$ | 0.94 |
| Example 5 | NaMnO$_2$, Na$_{14}$Mn$_2$O$_9$ | 0.92 |
| Example 6 | NaMnO$_2$, Na$_{14}$Mn$_2$O$_9$ | 0.92 |
| Example 7 | NaMnO$_2$, Na$_{14}$Mn$_2$O$_9$ | 0.81 |
| Example 8 | NaMnO$_2$, Na$_{14}$Mn$_2$O$_9$ | 0.83 |
| Example 9 | NaMnO$_2$, Na$_{14}$Mn$_2$O$_9$ | 0.80 |
| Example 10 | NaMnO$_2$, Na$_{14}$Mn$_2$O$_9$ | 0.90 |

Figure 3:
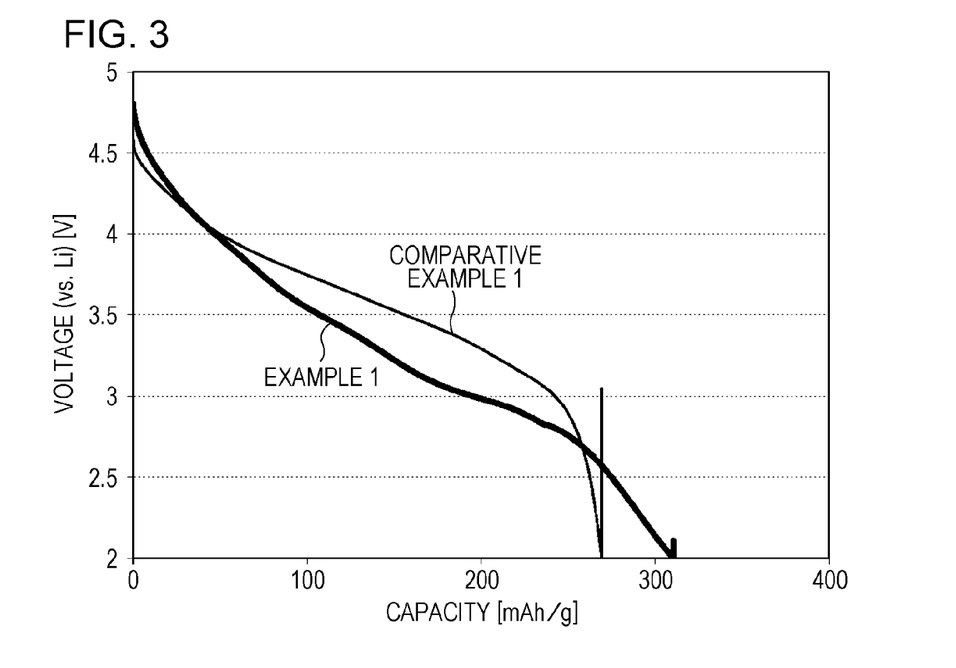
FIG. 3 is a graph showing the discharge curves of the batteries of Example 1 and Comparative Example 1.

As shown in Table 1, the initial discharge capacities of the batteries of Examples 1 to 10 were 264 to 310 mAh/g. In particular, the initial discharge capacities of the batteries of Examples 1 to 6 were 286 to 310 mAh/g and were larger than that of the battery of Comparative Example 1. Firstly, this is probably because the cathode active materials of Examples 1 to 6 each contained a larger amount of Li relative to the amount of the transition metal. This was caused by that a large amount of Na in Na$_{10}$Mn$_4$O$_9$ was replaced by Li. Secondly, this is probably because Na contained in the crystal structure of the cathode active material of each of Examples 1 to 6 partially distorted the crystal structure to improve the diffusibility of Li. FIG. 3 shows discharge curves of the batteries of Example 1 and Comparative Example 1. The initial discharge capacity of the battery of Example 1 was 310 mAh/g, which was considerably higher than that of the battery of Comparative Example 1. This initial discharge capacity of the battery of Example 1 was also considerably higher than 274 mAh/g, which is the theoretical limit value of the discharge capacity of a nickel-cobalt-aluminum complex oxide, one of traditional cathode active materials.

On the other hand, the initial discharge capacities of the batteries of Examples 7 to 10 were lower than that of the battery of Comparative Example 1. This is probably because the amounts of Li contained in the cathode active materials were lower than those of Examples 1 to 6. Accordingly, the compound represented by composition formula (1) may be produced such that α satisfies 0.19≤α≤0.3 for achieving a cathode active material having a large capacity. As described above, from the viewpoint of effectively using the redox reaction of oxygen, the compound may be produced such that α satisfies 0.16≤α≤0.3.

As described above, the precursor of Example 1 contained NaMnO$_2$ in addition to Na$_{10}$Mn$_4$O$_9$. Table 2, however, shows that the compound represented by composition formula (1) may be prepared not only from the precursor containing only NaMnO$_2$ as a by-product but also from the precursor containing both NaMnO$_2$ and Na$_{14}$Mn$_2$O$_9$ as by-products. It is believed that the compound represented by composition formula (1) may be also similarly prepared from a precursor containing Na$_{14}$Mn$_2$O$_9$ in addition to Na$_{10}$Mn$_4$O$_9$ and a precursor containing only Na$_{10}$Mn$_4$O$_9$. Tables 1 and 2 demonstrate that when the molar ratio of Na$_{10}$Mn$_4$O$_9$ in the precursor is larger than 0.9, α in composition formula (1) representing the resulting compound is 0.19 or more. In this case, a cathode active material having a larger capacity can be achieved.

The temperature of heat treatment during the ion exchange is not limited to the temperatures in Examples 1 to 10 and can be appropriately set. The temperature of heat treatment may be, for example, not lower than about 260° C. at which the molten salt melts. However, when the temperature of heat treatment is excessively higher than 350° C., the crystallinity of the lithium-manganese complex oxide may vary and reduce the capacity. Accordingly, the temperature of heat treatment during the ion exchange may be, for example, 350° C. or less.

The cathode active material for a nonaqueous electrolyte secondary battery disclosed in this disclosure may be used as, for example, a nonaqueous electrolyte secondary battery for a portable electronic device such as a mobile phone, a PDA, a personal computer, a digital camera, or a portable game machine; a nonaqueous electrolyte secondary battery for a vehicle such as an electric automobile or a hybrid automobile; or a stationary large nonaqueous electrolyte secondary battery.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A cathode active material for a nonaqueous electrolyte secondary battery mainly comprising a compound represented by a composition formula:

$Li_xNa_y(Li_\alpha Na_\beta Mn_{1-\alpha-\beta})O_2$, where x, y, α, and β satisfy:

$0.75x<1.0$;
$0<y\leq0.01$;
$0.75<x+y\leq1$;
$0.16\leq\alpha\leq0.3$;
$0\leq\beta\leq0.01$; and
$0.17\leq\alpha+\beta\leq0.3$.

2. The cathode active material for a nonaqueous electrolyte secondary battery according to claim 1, wherein the compound has a crystal structure belonging to space group C2/m.

3. The cathode active material for a nonaqueous electrolyte secondary battery according to claim 1, wherein:
α satisfies: $0.19\leq\alpha\leq0.3$, and
α and β satisfy: $0.2\leq\alpha+\beta\leq0.3$.

4. The cathode active material for a nonaqueous electrolyte secondary battery according to claim 1, wherein:
α satisfies $0.16\leq\alpha<0.3$, and
β satisfies: $0<\beta\leq0.01$.

5. A nonaqueous electrolyte secondary battery comprising:
a cathode containing the cathode active material according to claim 1;
an anode containing an anode active material;
a separator disposed between the cathode and the anode; and
a nonaqueous electrolytic solution.

6. The cathode active material for a nonaqueous electrolyte secondary battery according to claim 3, wherein:
α satisfies $0.19\leq\alpha<0.3$, and
β satisfies: $0<\beta\leq0.01$.

7. The cathode active material for a nonaqueous electrolyte secondary battery according to claim 1, wherein:
x satisfies $0.75\leq x\leq0.8$, and
x and y satisfy $0.75<x+y\leq0.81$.

* * * * *